US012747684B2

(12) United States Patent
Scheckel et al.

(10) Patent No.: US 12,747,684 B2
(45) Date of Patent: Sep. 29, 2026

(54) CRANKCASE VENTILATION ELEMENT

(71) Applicant: Atmus Filtration Inc., Nashville, TN (US)

(72) Inventors: Benjamin L. Scheckel, Stoughton, WI (US); Alexis Orea Amador, Middleton, WI (US); Ashwin K. Koleshwar, Stoughton, WI (US); Bryan P. Steffen, Oregon, WI (US); Bradley A. Smith, Columbus, IN (US)

(73) Assignee: Atmus Filtration Inc., Nashville, TN (US)

( * ) Notice: Subject to any disclaimer, the term of this patent is extended or adjusted under 35 U.S.C. 154(b) by 623 days.

(21) Appl. No.: 18/143,721

(22) Filed: May 5, 2023

(65) Prior Publication Data

US 2024/0369004 A1 Nov. 7, 2024

(51) Int. Cl.

| | |
|---|---|
| ***F01M 13/04*** | (2006.01) |
| ***B01D 46/00*** | (2022.01) |
| *F01M 13/00* | (2006.01) |

(52) U.S. Cl.

CPC ......... *F01M 13/04* (2013.01); *B01D 46/0005* (2013.01); *B01D 46/0031* (2013.01); *B01D 2271/027* (2013.01); *F01M 2013/0038* (2013.01); *F01M 2013/0438* (2013.01)

(58) Field of Classification Search

CPC ........... F01M 13/04; F01M 2013/0438; F01M 2013/0433; F01M 13/0011; F01M 13/0033; F01M 2013/0038; F01M 2013/0488; F01M 13/0416; B01D 46/0005; B01D 46/0031; B01D 46/0002; B01D 46/10; B01D 2265/026; B01D 2271/02; B01D 2271/027; B01D 2275/206; B01D 46/0012; B01D 2277/20; B01D 2279/60; B01D 46/00; B01D 2279/35; B01D 2279/55

USPC ............................................................ 55/502

See application file for complete search history.

(56) References Cited

U.S. PATENT DOCUMENTS

| | | | |
|---|---|---|---|
| 6,247,463 | B1 | 6/2001 | Fedorowicz et al. |
| 6,290,738 | B1 | 9/2001 | Holm |
| 6,354,283 | B1 | 3/2002 | Hawkins et al. |
| 6,478,018 | B2 | 11/2002 | Fedorowicz et al. |
| 6,478,019 | B2 | 11/2002 | Fedorowicz et al. |

(Continued)

FOREIGN PATENT DOCUMENTS

| | | | |
|---|---|---|---|
| DE | 102018123770 A1 * | 3/2020 | ......... B01D 46/0005 |
| JP | 2009047247 A * | 3/2009 | ......... B01D 46/0005 |
| WO | WO-2014/151774 | 9/2014 | |

*Primary Examiner* — Qianping He

(74) *Attorney, Agent, or Firm* — Benesch Friedlander Coplan & Aronoff LLP

(57) ABSTRACT

A crankcase ventilation element is provided. The element includes a plate including a first port. The first port extends from the plate in a first direction. The element includes a housing coupled with the plate. The housing defines an axial centerline. The housing includes a second port extending from the housing in a second direction opposite the first direction. The housing includes a flange extending around a perimeter of the housing. The flange includes a sealing surface. The element includes a filter media disposed between the plate and the housing. The first port and the second port intersect the axial centerline. The first port is axially offset from the second port. The first port is laterally offset from the second port.

20 Claims, 6 Drawing Sheets

(56) References Cited

U.S. PATENT DOCUMENTS

| | | | | |
|---|---|---|---|---|
| 7,582,130 | B2 | 9/2009 | Ng et al. | |
| 7,674,425 | B2 | 3/2010 | Schwandt et al. | |
| 7,776,139 | B2 | 8/2010 | Schwandt et al. | |
| 7,828,869 | B1 | 11/2010 | Parikh et al. | |
| 7,959,714 | B2 | 6/2011 | Smith et al. | |
| 8,105,412 | B2 | 1/2012 | Severance et al. | |
| 8,114,182 | B2 | 2/2012 | Smith et al. | |
| 8,114,183 | B2 | 2/2012 | Schwandt et al. | |
| 8,545,707 | B2 | 10/2013 | Rego et al. | |
| 9,138,673 | B2 | 9/2015 | Von Seggern | |
| D769,328 | S | 10/2016 | Ide et al. | |
| D769,329 | S | 10/2016 | Ide et al. | |
| 9,757,672 | B2 | 9/2017 | Von Seggern | |
| 9,951,668 | B2 | 4/2018 | Ide et al. | |
| 10,029,197 | B2 | 7/2018 | Holzmann et al. | |
| 11,035,266 | B2 | 6/2021 | Ide et al. | |
| 2006/0005817 | A1 * | 1/2006 | Paek ................ | F02M 35/10255 123/198 DB |
| 2014/0102058 | A1 * | 4/2014 | Kaufmann ............. | B01D 46/56 55/482 |
| 2018/0154294 | A1 * | 6/2018 | Holzmann ......... | B01D 46/0091 |
| 2018/0238207 | A1 | 8/2018 | De et al. | |

* cited by examiner

CRANKCASE VENTILATION ELEMENT

TECHNICAL FIELD

The present application relates generally to crankcase ventilation systems for use with internal combustion engine systems.

BACKGROUND

During operation of an internal combustion engine, a fraction of combustion gases can flow out of the combustion cylinder and into the crankcase of the engine. These gases are often called "blowby" gases. The blowby gas stream includes a mixture of aerosols, oils, and air. If vented directly to the ambient, the blowby gas stream can potentially harm the environment and/or may be subject to government emissions regulations. Accordingly, the blowby gas stream is typically routed out of the crankcase via a crankcase ventilation system. The crankcase ventilation system may pass the blowby gas stream through a separator or filter to remove a majority of the aerosols and oils contained in the blowby gas stream. The filtered blowby gas stream is then either vented to the ambient (in open crankcase ventilation systems) or routed back to the air intake for the internal combustion engine for further combustion (in closed crankcase ventilation systems).

Various 1 crankcase ventilation systems utilize a filter element to filter the blowby gas stream. The filter elements traditionally comprise a plurality of ports that act as inlets and outlets for the blowby gas stream, or portions thereof (e.g., separated oil), that travel through the crankcase. For example, the filter element may be configured to separate oil from air. The blowby gas stream can enter a first port, the oil of the blowby gas stream can be separated from the air, and the oil can be returned to the engine via a second exit port.

SUMMARY OF THE INVENTION

At least one embodiment relates to a crankcase ventilation element. The element includes a plate including a first port. The first port extends from the plate in a first direction. The element includes a housing coupled with the plate. The housing defines an axial centerline. The housing includes a second port extending from the housing in a second direction opposite the first direction. The housing includes a flange extending around a perimeter of the housing. The flange includes a sealing surface. The element includes a filter media disposed between the plate and the housing. The first port and the second port intersect the axial centerline. The first port is axially offset from the second port. The first port is laterally offset from the second port.

At least one embodiment relates to a crankcase ventilation element. The element includes a plate. The plate includes a plate body and a first port. The first port extends from the plate body in a first direction. The first port includes a first sealing element. The element includes a housing coupled with the plate. The housing includes a first end and a second end opposite the first end. The housing includes a flange extending around a perimeter of the housing. The flange includes a seal surface. The seal surface defines a plane. The housing includes a second port disposed proximate to the first end of the housing. The second port extends from the housing away from the plate in a second direction opposite the first direction. The second port includes a second sealing element. The first sealing element is disposed a first seal distance from the plane and the second sealing element disposed a second seal distance from the plane. The second seal distance is greater than the first seal distance. The first port is disposed closer to the first end of the housing than the second end.

These and other features, together with the organization and manner of operation thereof, will become apparent from the following detailed description when taken in conjunction with the accompanying drawings. This summary is illustrative only and should not be regarded as limiting.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Referring to the figures generally, various embodiments described herein relate to a crankcase ventilation system that includes a filter element for separating substances of a blowby gas stream. In particular, embodiments described herein relate to a crankcase ventilation system that includes a filter element that includes an inlet port configured to couple with a base unit of an engine. The inlet port creates a seal with the base unit such that fluid from the engine flows through the filter element before being directed to the ambient air or back into the engine. The inlet port defines a first opening for receiving the fluid from the engine and a second opening for draining a contaminant that is separated from the fluid. By including the first opening and the second opening within the same inlet port, only a single port creates a seal with the base unit, reducing the number of locations for potential leakage.

Additionally, the location of the inlet port relative to other features of the filter element allow for secure sealing between the filter element and the engine and/or an engine housing (e.g., the base unit and a cover). For example, the filter element defines an axial centerline. Both the inlet port and an outlet port intersect the axial centerline. However, the inlet port is still laterally offset from the outlet port. Additionally, the outlet port is disposed proximate to a first end of the filter element. The inlet port is disposed closer to the first end of the filter element than the second, opposite end. The precise location of these features relative to each other facilitates effective sealing between the filter element and the engine/engine housing.

Figure 1:
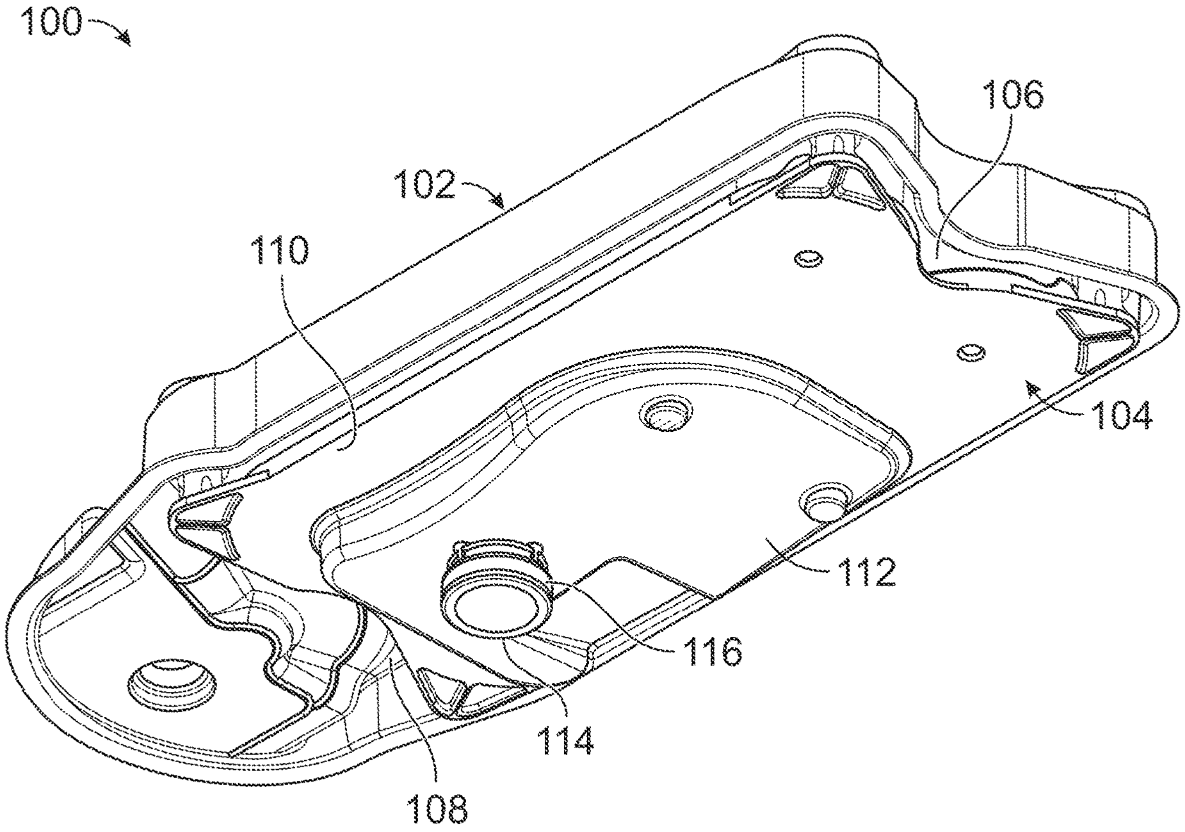
FIG. 1 is a bottom perspective view of a crankcase ventilation element, according to an embodiment.

Referring to FIG. 1, a crankcase ventilation crankcase ventilation element 100 is shown, according to an embodiment. The crankcase ventilation element 100 generally processes fluids, namely blowby gases received from an internal combustion engine crankcase to remove aerosols, oils, and other contaminants or particulates contained in the crankcase blowby gases. The crankcase ventilation element 100 includes a housing 102, a plate 104, and filter media 106. The housing 102 defines a cavity 108 to receive the filter media 106. The filter media 106 is disposed between the plate 104 and the housing 102.

The plate 104 is coupled to the housing 102. The plate 104 includes a plate body 110. The plate body 110 and the housing 102 can at least partially enclose the filter media 106. The plate body 110 couples with the housing 102 to secure a position of the filter media 106 and facilitate fluid flowing through the filter media 106 before exiting the crankcase ventilation element 100.

In some embodiments, the plate 104 includes a plenum 112. The plenum 112 can house components configured to separate contaminants or particulates from a fluid that enters the element and provide passage for the fluid to enter the filter media 106. The plenum 112 extends away from the plate body 110 in a direction away from the housing 102.

The plate 104 includes an inlet port 114. The inlet port 114 is configured to form a seal with an external component (e.g., a base unit of an engine housing) such that a fluid from the external component can flow into the crankcase ventilation element 100 via the inlet port 114 to be filtered. The inlet port 114 extends from the plate body 110 of the plate 104 away from the housing 102. The inlet port 114 includes an inlet sealing element 116 to form the seal with the external component. For example, the inlet sealing element 116 includes a recess in the inlet port 114 that is configured to receive an O-ring or other gasket to form the seal between the inlet port 114 and the external component. The inlet sealing element 116 is a radial sealing element. The inlet sealing element 116 is an external seal element disposed around an outside of the inlet port 114.

Figure 2:
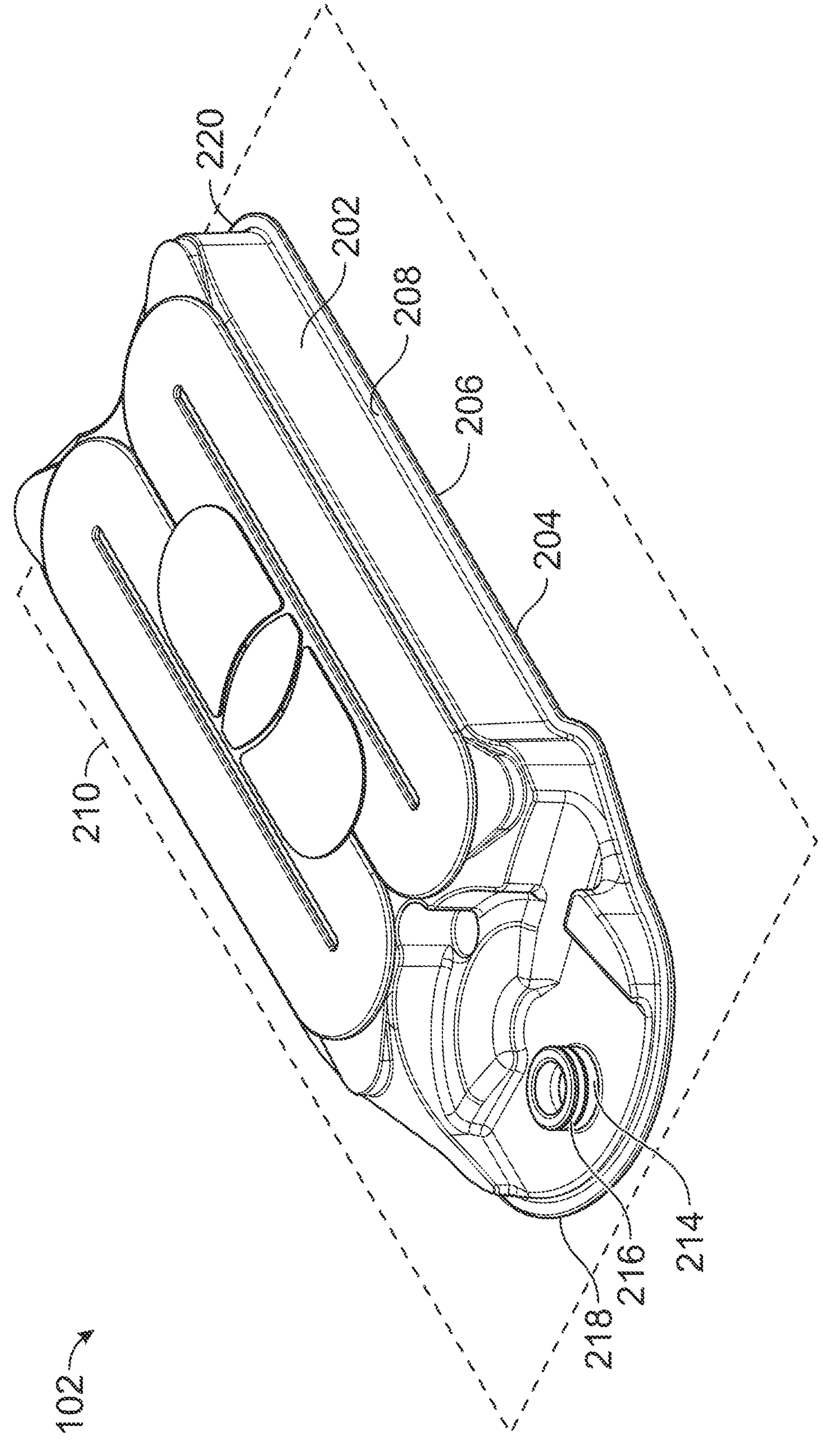
FIG. 2 is a top perspective view of a housing of the crankcase ventilation element of FIG. 1.

Referring to FIG. 2, the housing 102 of the crankcase ventilation element 100 is shown. The housing 102 includes a housing body 202. The housing body 202 defines the cavity 108 of the housing 102. The housing 102 includes a flange 204 that extends around a perimeter of the housing body 202. The flange 204 is configured to form a seal with an external component (e.g., a base unit and/or a cover of an engine housing). For example, the flange 204 is an axial sealing element. The flange 204 includes a first sealing surface 206 and a second sealing surface 208. The first sealing surface 206 faces away from the housing body 202 toward the plate 104. The first sealing surface 206 of the flange 204 defines a plane 210. The second sealing surface 208 faces toward the housing body 202 away from the plate 104. In some embodiments, a gasket or other sealing component can be disposed on or coupled with at least one surface 206, 208 of the flange 204 to facilitate creation of the seal. The flange 204 can be disposed between two portions of an external component (e.g., a base unit and a cover) to form the seal.

The housing 102 includes an outlet port 214. The outlet port 214 is configured to form a seal with an external component (e.g., a cover of an engine housing) such that the fluid that flows through the crankcase ventilation element 100 exits the crankcase ventilation element 100 via the outlet port 214 to a predetermined location (e.g., the atmosphere, back to the engine, etc.). The outlet port 214 includes an outlet sealing element 216 to form the seal with the external component. For example, the outlet sealing element 216 can create a seal between the outlet port 214 and a corresponding port of a cover of an engine housing. In some embodiments, the outlet sealing element 216 includes a recess in the outlet port 214 that is configured to receive an O-ring or other gasket to form the seal between the outlet port 214 and the external component. The outlet sealing element 216 is a radial sealing element. The outlet sealing element 216 is an external sealing element disposed around an outside of the outlet port 214. The housing 102 has a first end 218 and a second end 220. The second end 220 is opposite the first end 218. The outlet port 214 is disposed proximate to the first end 218.

Figure 3:
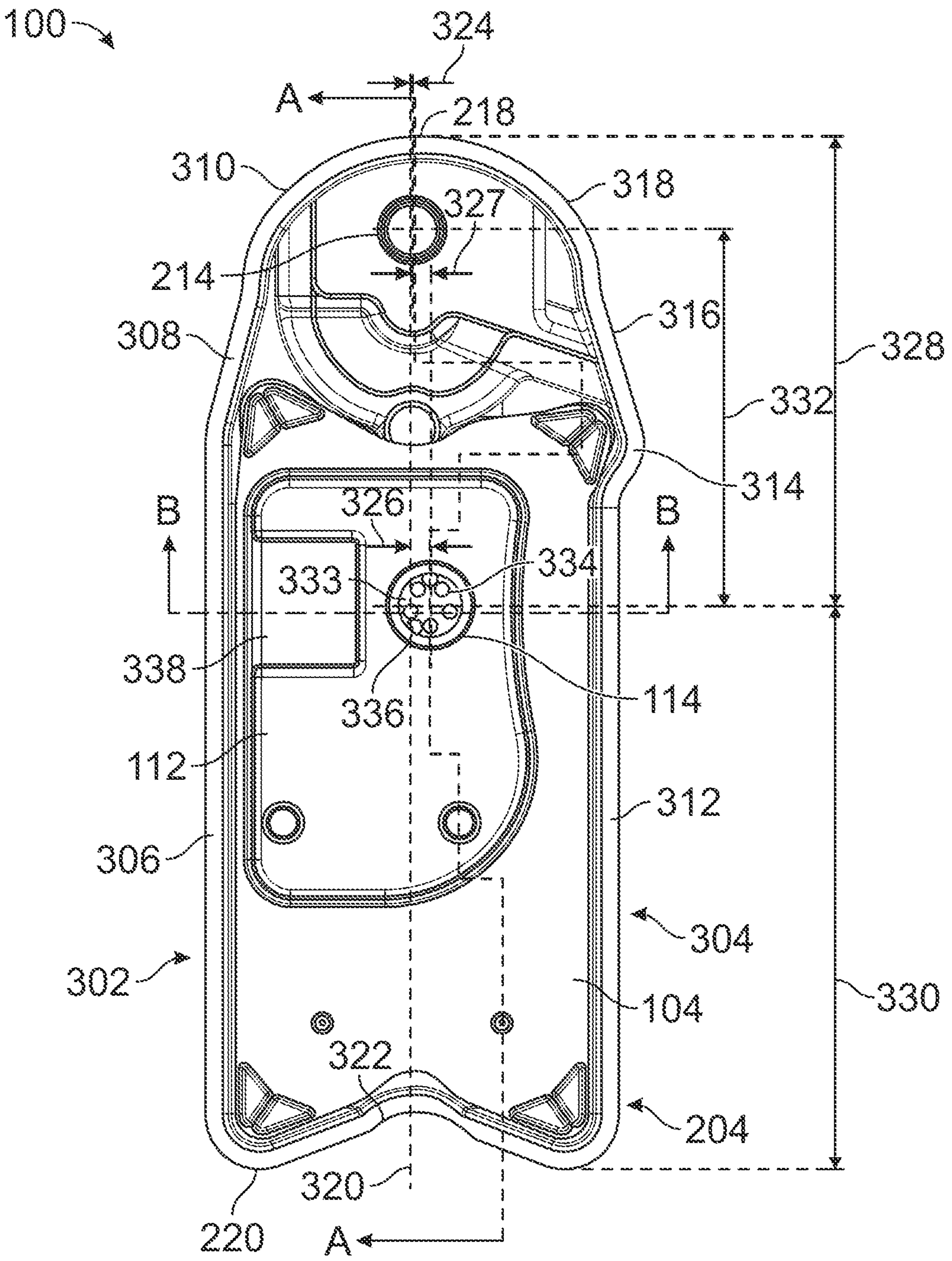
FIG. 3 is a bottom view of the crankcase ventilation element of FIG. 1.

Referring to FIG. 3, a bottom view of the crankcase ventilation element 100 is shown. The flange 204 of the housing 102 comprises a first side 302 and a second side 304. The first side 302 comprises a first elongated portion 306, a first angled portion 308, and a first curved portion 310. The first angled portion 308 extends between the first elongated portion 306 and the first curved portion 310. For example, the first angled portion 308 transitions from the first elongated portion 306. The first curved portion 310 transitions from the first angled portion 308. The second side 304 comprises a second elongated portion 312, a projection 314, a second angled portion 316, and a second curved portion 318. The projection 314 and the second angled portion 316 extend between the second elongated portion 312 and the second curved portion 318. For example, the projection 314 transitions from the second elongated portion 312. The projection 314 extends away from the first side 302 of the flange 204. The second angled portion 316 transitions from the projection 314. The second curved portion 318 transitions from the second angled portion 316. The second curved portion 318 transitions into the first curved portion 310.

The housing 102 defines an axial centerline 320. For example, the first elongated portion 306 and the second elongated portion 312 define the axial centerline 320 therebetween. The axial centerline 320 is centered between the first elongated portion 302 and the second elongated portion 304. The second end 220 of the housing 102 has an indentation 322. A center of the indentation 322 may be offset from the axial centerline 320. The indentation 322 extends into the housing 102 toward the first end 218.

The outlet port 214 of the housing 102 intersects the axial centerline 320. A center of the outlet port 214 is laterally offset from the axial centerline 320. For example, the center of the outlet port 214 is disposed on a first side of the axial centerline 320. The center of the outlet port 214 is disposed closer to the second side 304 of the flange 204 than the first side 302. For example, the outlet port 214 is disposed closer to the second elongated portion 312 of the flange 204 than the first elongated portion 306. In some embodiments, the outlet port 214 can be aligned with the axial centerline 320 or be disposed on the opposite side (e.g., the second side) of the axial centerline 320.

The inlet port 114 of the plate 104 intersects the axial centerline 320. A center of the inlet port 114 is laterally offset from the axial centerline 320. For example, the center of the inlet port 114 is disposed on the first side of the axial centerline 320 (e.g., same side as the outlet port 214). The inlet port 114 is disposed closer to the second elongated portion 312 of the flange 204 than the first elongated portion 306. The inlet port 114 is laterally offset from the outlet port 214. The center of the inlet port 114 is disposed closer to the second side 304 of the flange 204 than the first side 302. The outlet port 214 is offset from the axial centerline 320 a first lateral offset distance 324. The inlet port 114 is offset from the axial centerline 320 a second lateral offset distance 326. The second lateral offset distance 326 is greater than the first lateral offset distance 324. In a particular embodiment, the first lateral offset distance 324 is approximately 0.11 mm (e.g., +/−1.50 mm), and the second lateral offset distance 326 is approximately 7.21 mm (e.g., +/−1.50 mm) The first lateral offset distance 324 and the second lateral offset distance 326 can be combined (e.g., subtracted) to determine a port offset distance 327. The port offset distance 327 defining a lateral offset between the inlet port 114 and the outlet port 214. In a particular embodiment, the port offset distance 327 is approximately 7.10 mm (e.g., +/−1.50 mm).

The outlet port 214 is disposed closer to the first end 218 of the housing 102 than the second end 220 of the housing 102. For example, the outlet port 214 is disposed proximate to the first end 218 of the housing 102 between the first curved portion 310 and the second curved portion 318. The inlet port 114 is also disposed closer to the first end 218 of the housing 102 than the second end 220. The inlet port 114 is disposed a first distance 328 from the first end 218 of the housing 102 and a second distance 330 from the second end 220. The first distance 328 is less than the second distance 330 (e.g., the inlet port 114 is disposed closer to the first end 218 than the second end 220). In a particular embodiment, the first distance 328 is approximately 188.76 mm (e.g., +/−1.50 mm), and the second distance 330 is approximately 233.20 mm (e.g., +/−1.50 mm). The inlet port 114 is axially offset from the outlet port 214. For example, the outlet port 214 is disposed closer to the first end 218 than the inlet port 114. The inlet port 114 is disposed between the first elongated portion 306 and the second elongated portion 312 of the flange 204. The center of the inlet port 114 is disposed an axial offset distance 332 away from the center of the outlet port 214. In a particular embodiment, the axial offset distance 332 is approximately 151.20 mm (e.g., +/−1.50 mm).

The inlet port 114 comprises an inlet base 333. The inlet base 333 is disposed in the plenum 112. The inlet base 333 defines an inlet opening 334. The inlet opening 333 extends through the inlet base 333. The inlet opening 334 is configured to receive a fluid and provide passage for the fluid to enter the crankcase ventilation element 100. In some embodiments, the inlet port 114 defines a plurality of inlet openings 334. The plurality of inlet openings 334 are disposed concentrically around a center of the inlet port 114. The inlet openings 334 are disposed adjacent to an inner surface of the inlet port 114. In the embodiment depicted in FIG. 6, the inlet openings 334 are spaced apart equidistant from adjacent inlet openings 334.

The inlet port 114 includes a drain 336. The drain 336 is configured to drain a contaminant or particulate separated from the fluid and provide passage for the contaminant or particulate to exit the crankcase ventilation element 100. The drain 336 extends from the inlet base 333 into the inlet port 114 (e.g., in a direction away from the plane 210). The drain 336 can extend a distance such that the drain 336 is disposed in the plenum 112 and an end of the drain 336 does not extend beyond an external surface of the plenum 112. The drain 336 may have a cylindrical shape. The drain 336 is disposed further away from the center of the inlet port 114 than the inlet openings 334. In some embodiments, the drain 336 interfaces with or intersects with the structure of the inlet port 114. In some embodiments, the inlet port 114 includes a plurality of drains 336. The inlet port 114 includes fewer drains 336 than inlet openings 334. In some embodiments, the drain 336 is disposed between two adjacent inlet openings 334. The crankcase ventilation element 100 includes no drain opening 336 external of the inlet port 114.

The plenum 112 of the plate 104 extends from the plate body 110 to the inlet port 114. The plenum 112 is disposed, at least partially, between the first elongated portion 306 and the second elongated portion 312 of the flange 204. A majority of the plenum 112 is disposed on a first side of the axial centerline 320. A majority of the inlet port 114 is disposed on a second, opposite side of the axial centerline 320. In some embodiments, the plenum 112 includes a detented region 338. The detented region 338 defines a path for the fluid to flow within the plenum 112. The detented region 338 is disposed on the first side of the axial centerline 320. The detented region 338 is at least partially axially aligned with the inlet port 114.

Figure 4:
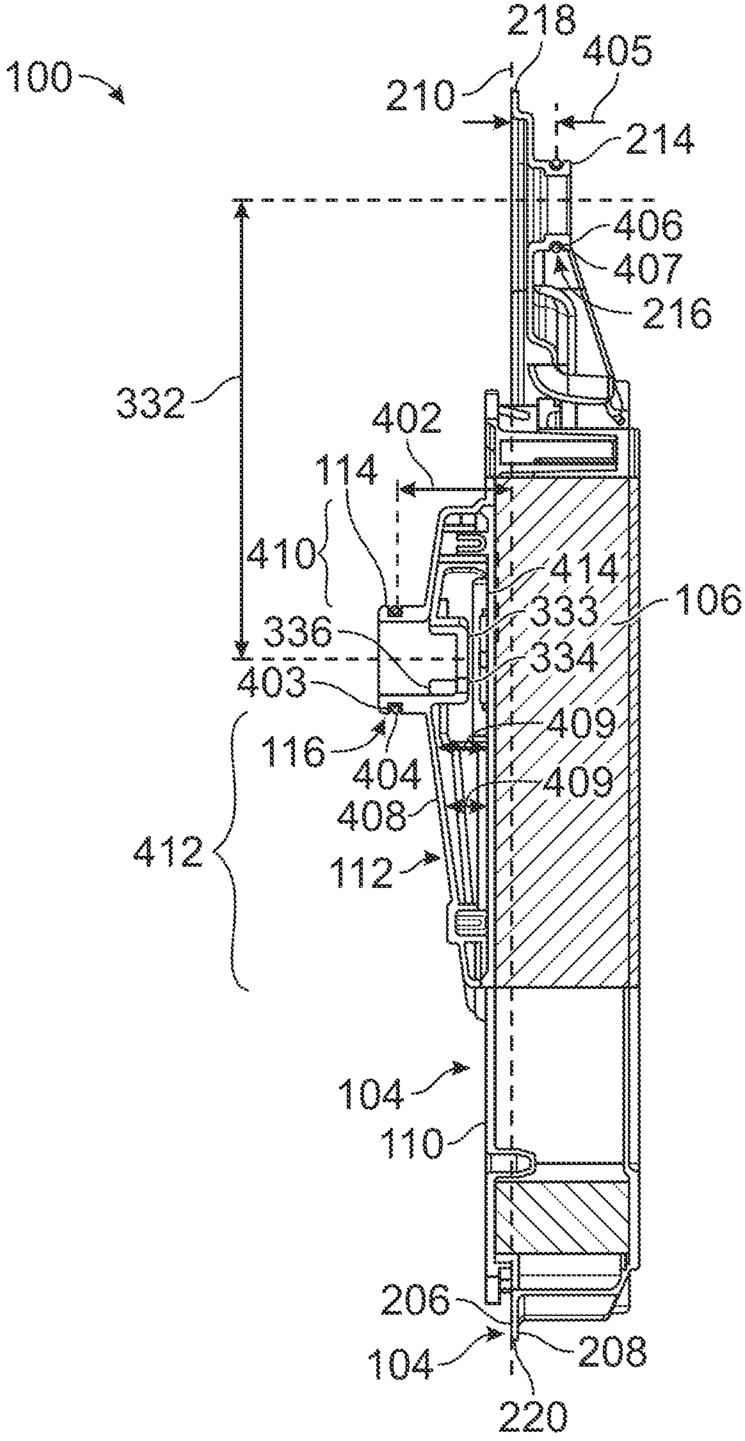
FIG. 4 is a cross-sectional view of the crankcase ventilation element of FIG. 1 taken along plane A-A of FIG. 3.
Figure 5:
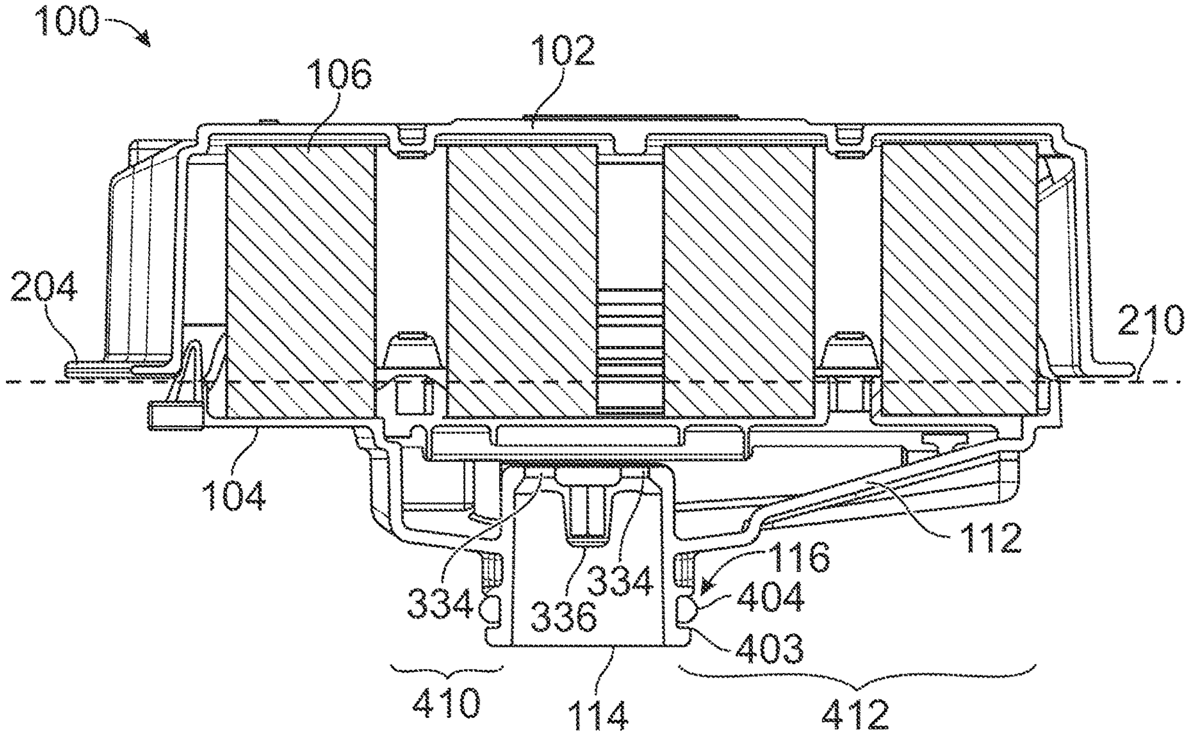
FIG. 5 is a cross-sectional view of the crankcase ventilation element of FIG. 1 taken along plane B-B of FIG. 3.

Referring to FIGS. 4 and 5, cross-sectional views of the crankcase ventilation element 100 are shown, according to an embodiment. FIG. 4 shows a side cross-sectional view of the crankcase ventilation element 100 taken along plane A-A of FIG. 3 and FIG. 5 shows a rear cross-sectional view of the crankcase ventilation element 100 taken along plane B-B of FIG. 3. The inlet port 114 extends from the plate body 110 in a first direction away from the housing 102. The inlet port 114 includes an inlet sealing element 116. The inlet sealing element 116 is disposed an inlet seal distance 402 away from the plane 210 of the flange 204. In some embodiments, the inlet sealing element 116 includes an inlet recess 403. The inlet recess 403 extends around at least a portion of the inlet port 114. In some embodiments, the inlet recess 403 extends around the entire inlet port 114. The inlet recess 403 is configured to receive an inlet gasket 404. The inlet gasket 404 can be any component (e.g., an O-ring) configured to fill a gap and form a seal between two mating surfaces. The inlet gasket 404 can be disposed at least partially in the inlet recess 403. The inlet recess 403 can have a width. In a particular embodiment, the width of the inlet recess 403 is approximately 5.00 mm (e.g., +/−1.50 mm). The inlet seal distance 402 can be measured from a center of the inlet recess 403.

The outlet port 214 extends from the housing 102 in a second direction away from the plate 104. The second direction is opposite the first direction. The outlet port 214 includes an outlet sealing element 216. The outlet sealing element 216 is disposed an outlet seal distance 405 away from the plane 210 of the flange 204. The inlet seal distance 402 is greater than the outlet seal distance 405. In a particular embodiment, the inlet seal distance 402 is approximately 39.14 mm (e.g., +/−1.50 mm), and the outlet seal distance 405 is approximately 14.42 mm (e.g., +/−1.50 mm).

In some embodiments, the outlet sealing element 216 includes an outlet recess 406. The outlet recess 406 extends around at least a portion of the outlet port 214. In some embodiments, the outlet recess 406 extends around the entire outlet port 214. The outlet recess 406 is configured to receive an outlet gasket 407. The outlet gasket 407 can be any component (e.g., an O-ring) configured to fill a gap and form a seal between two mating surfaces. The outlet gasket 407 can be disposed, at least partially, in the outlet recess 406. The outlet recess 406 can have a width. In a particular embodiment, the width of the outlet recess 406 is approximately 4.75 mm (e.g., +/−1.50 mm). The outlet seal distance 405 can be measured from a center of the outlet recess 406.

The plenum 112 includes a plenum wall 408. The plenum wall 408 extends at least partially axially along the plate 104. The plenum wall 408 can be disposed a plenum distance 409 away from the plate body 110. The plenum wall 408 can be disposed at an angle relative to (e.g., not parallel with) the plate body 110 such that the plenum distance 409 varies along the plenum wall 408. For example, the plenum wall 408 can extend from a first location away from the inlet port 114 to a second location adjacent to the inlet port 114. At the first location, the plenum wall 408 can be disposed at a first plenum distance 409. At the second location, the plenum wall 408 can be disposed at a second plenum distance 409. The first plenum distance 409 can be less than the second plenum distance 409. The plenum distance 409 is greatest at or adjacent to the inlet port 114.

The plenum 112 has a first plenum portion 410 disposed on a first side of the inlet port 114 and a second plenum portion 412 disposed on a second side of the inlet port 114. The first plenum portion 410 extends from the inlet port 114 toward the first end 218 of the housing 102. The second plenum portion 412 extends from the inlet port 114 toward the second end 220 of the housing 102. The first plenum portion 410 is shorter than the second plenum portion 412.

The plenum 112 includes a separator 414. The separator 414 is a first stage separator 414. The separator 414 is configured to separate contaminants or particulates from a fluid received by the crankcase ventilation element 100 prior to reaching the filter media 106. The inlet port 114 can provide a passage for fluid to enter the crankcase ventilation element 100. For example, the fluid can enter the crankcase ventilation element 100 via the inlet opening 334 of the inlet port 114. From the inlet port 114, the fluid can enter the separator 414. The separator 414 can separate contaminants or particulates (e.g., oil) from the fluid (e.g., air). The inlet port 114 can provide a passage for the contaminants or particulates to exit the crankcase ventilation element 100. For example, the contaminants or particulates can exit the crankcase ventilation element 100 via the drain opening 336 of the inlet port 114. The fluid that does not exit the crankcase ventilation element 100 via the drain opening 336 can flow from the separator 414 into the rest of the plenum 112. The plenum 112 can provide a passage for the fluid to enter the filter media 106. The remaining fluid that passes through the filter media 106 can exit the crankcase ventilation element 100 via the outlet port 214.

Figure 6:
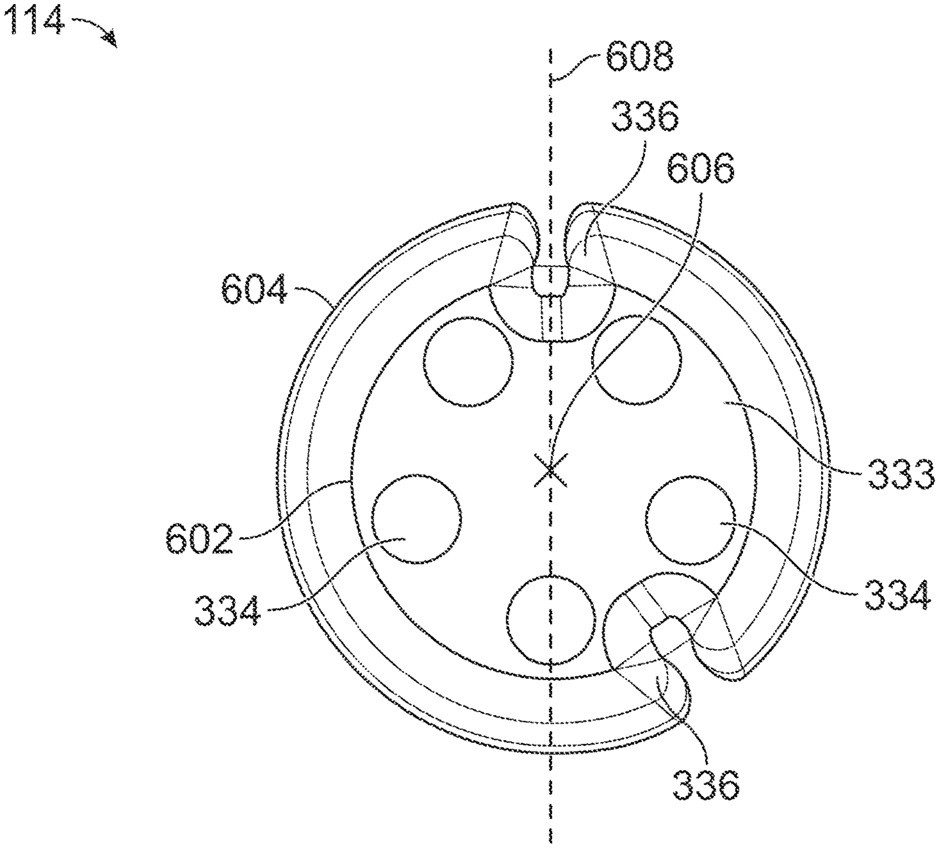
FIG. 6 is a rear view of an inlet port of the crankcase ventilation element of FIG. 1.

Referring to FIG. 6, a rear side of the inlet port 114 is shown. The inlet port 114 of FIG. 6 has a circular shape. The inlet port 114 includes an inner inlet surface 602 and an outer inlet surface 604. The inner inlet surface 602 and the outer inlet surface 604 can be disposed concentrically around an inlet center 606 of the inlet port 114. An inlet axial centerline 608 extends through the inlet center 606. The inlet axial centerline 608 is parallel to the axial centerline 320 of the housing 102 with the plate 104 coupled to the housing 102. The inlet openings 334 are disposed radially away from the inlet center 606. The inlet openings 334 are disposed concentrically around the inlet center 606. The inlet openings 334 are disposed symmetrically about the inlet centerline 608. The inlet openings 334 are disposed adjacent to the inner inlet surface 602. The inlet openings 334 are spaced apart from the inner inlet surface 602.

The drains 336 are disposed radially away from the inlet center 606. The drains 336 are disposed concentrically around the inlet center 606. The drains 336 are disposed asymmetrically about the inlet centerline 608. For example, a first drain 336 intersects the inlet centerline 608 and a second drain 336 is disposed on the first or second side of the inlet centerline 608 and does not intersect the inlet centerline 608. Each drain 336 intersects the inner inlet surface 602. In some embodiments, the drain 336 intersects both the inner inlet surface 602 and the outer inlet surface 604. For example, the drain 336 can extend from the inlet base 333 inside the inner inlet surface 602 through the outer inlet surface 604.

Figure 7:
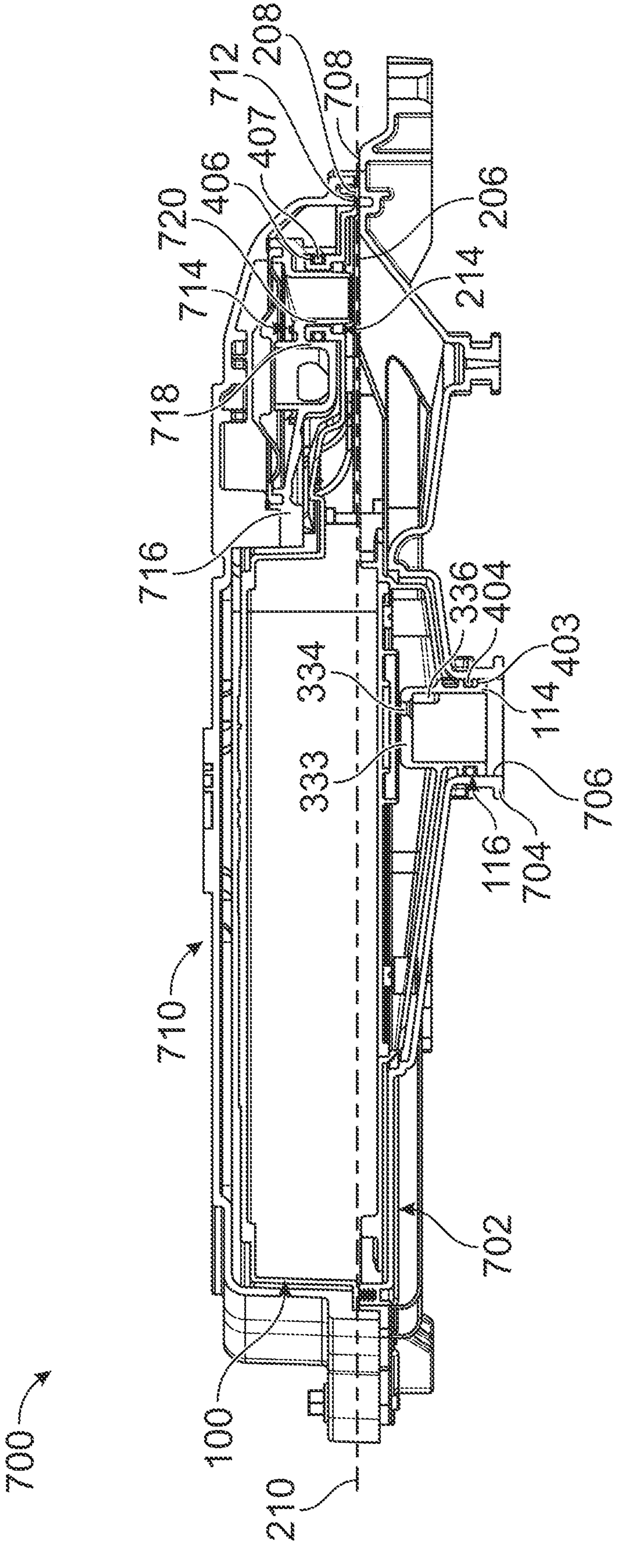
FIG. 7 is a cross-sectional view of the crankcase ventilation element of FIG. 1 disposed between a base unit and a cover.

Referring to FIG. 7, a crankcase ventilation system 700 is shown, according to an embodiment. The crankcase ventilation system 700 can position the crankcase ventilation element 100 such that fluid flows from an engine through the crankcase ventilation element 100 before being released into the atmosphere or back into the engine. The crankcase ventilation system 700 can form seals to prevent leakage of the fluid.

The crankcase ventilation system 700 includes a base unit 702. The base unit 702 is to be disposed on a first side of the crankcase ventilation element 100. For example, the base unit 702 is to be disposed on the same side of the crankcase ventilation element 100 as the inlet port 114. The crankcase ventilation element 100 is configured to form at least one seal with the base unit 702. For example, the base unit 702 includes a base port 704. The base port 704 is configured to receive at least a portion of the inlet port 114 of the crankcase ventilation element 100. The base port 704 has an inner base port surface 706. The inner base port surface 706 can create a seal with the inlet sealing element 116 of the inlet port 114. For example, at least a portion of the inlet port 114 can be disposed in the base port 704 such that the inlet gasket 404 disposed in the inlet recess 403 can contact and form a seal with the inner base port surface 706. In some embodiments, a portion of the side of the inlet port 114 also contacts the inner base port surface 706.

The crankcase ventilation element 100 can form a second seal with the base unit 702. For example, the base unit 702 includes a base sealing surface 708. The base sealing surface 708 can interface with the first sealing surface 206 of the flange 204 of the crankcase ventilation element 100 to form the second seal.

The crankcase ventilation system 700 includes a cover 710. The cover 710 is to be disposed on a second side of the crankcase ventilation element 100. For example, the cover 710 is to be disposed on the same side of the crankcase ventilation element 100 as the outlet port 214. The crankcase ventilation element 100 is configured to form at least one seal with the cover 710. For example, the cover 710 includes a cover sealing surface 712. The cover sealing surface 712 can interface with the second sealing surface 208 of the flange 204 of the crankcase ventilation element 100 to form a seal. The cover 710 can be coupled with the base unit 702. For example, the cover 710 and the base unit 702 can be coupled together via a bolt, or any other fastener. The flange 204 can be pinched between the base sealing surface 708 and the cover sealing surface 712.

The crankcase ventilation element 100 can form a second seal with the cover 710. For example, the cover 710 includes a cover port 714. The cover port 714 is configured to receive at least a portion of the outlet port 214 of the crankcase ventilation element 100. The cover port 714 may be integral with the cover 710 or coupled to the cover 710. For example, in some embodiments, the cover port 714 is a part of a crankcase depression regulator 716 that is coupled to the cover 710.

The cover port 714 includes an outer wall 718. The outer wall 718 can create a seal with the outlet sealing element 216 of the outlet port 214. For example, at least a portion of the outlet port 214 can be disposed in the cover port 714 such that the outlet gasket 407 disposed in the outlet recess 406 can contact and form a seal with the outer wall 718. In some embodiments, the cover port 714 includes an inner wall 720. The outlet port 214 can be disposed between the inner wall 720 and the outer wall 718. The outlet port 214 can contact the inner wall 720 and form a seal with the inner wall 720.

As utilized herein, the terms "substantially" "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Regarding the term "approximately" and similar terms, some example tolerances to be considered when interpreting such terms can be +/−0.25 mm based on perpendicularity (e.g., 0.25 mm in any direction), +/−1.50 mm based on perimeter tolerance, and +/−5.00 mm based on tolerance and interaction estimates.

The terms "coupled," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A crankcase ventilation element, comprising:

a plate comprising a first port, the first port defining a first longitudinal axis extending from the plate in a first direction;

a housing coupled with the plate, the housing defining an axial centerline orthogonal to the first direction, the housing comprising:

a second port defining a second longitudinal axis extending from the housing in a second direction opposite the first direction and orthogonal to the axial centerline; and a flange extending around a perimeter of the housing, the flange comprising a sealing surface; and a filter media disposed between the plate and the housing, wherein:

the first port and the second port intersect the axial centerline;

the first port is axially offset from the second port; and the first port is laterally offset from the second port.

2. The crankcase ventilation element of claim 1, wherein the first port defines a port centerline and comprises a plurality of drains, the plurality of drains disposed asymmetrically around the port centerline.

3. The crankcase ventilation element of claim 1, wherein:

the flange defines a plane; and the first port comprises an inlet sealing element disposed an inlet seal distance away from the plane, wherein the inlet seal distance is approximately 39 mm.

4. The crankcase ventilation element of claim 3, wherein the second port comprises an outlet sealing element, the outlet sealing element disposed an outlet seal distance away from the plane, the inlet seal distance greater than the outlet seal distance.

5. The crankcase ventilation element of claim 4, wherein the outlet seal distance is approximately 14.5 mm.

6. The crankcase ventilation element of claim 1, wherein:

the flange comprises a first elongated portion and a second elongated portion, the first elongated portion and the second elongated portion defining the axial centerline therebetween; and the first port is disposed closer to the second elongated portion than the first elongated portion.

7. The crankcase ventilation element of claim 6, wherein a center of the first port is offset from the axial centerline a lateral offset distance, wherein the lateral offset distance is approximately 7.2 mm.

8. The crankcase ventilation element of claim 1, wherein the housing comprises a first end and a second end, the first port disposed a first distance from the first end and a second distance from the second end, the first distance less than the second distance.

9. The crankcase ventilation element of claim 1, wherein the crankcase ventilation element comprises no drain opening external to the first port.

10. The crankcase ventilation element of claim 1, wherein the flange of the housing comprises:

a first side comprising:

a first elongated portion;

a first angled portion transitioning from the first elongated portion; and a first curved portion transitioning from the first angled portion; and a second side comprising:

a second elongated portion;

a projection transitioning from the second elongated portion, the projection extending away from the first side;

a second angled portion transitioning from the projection; and a second curved portion transitioning from the second angled portion, the second curved portion transitioning into the first curved portion.

11. The crankcase ventilation element of claim 10, wherein:

the first port comprises an inlet sealing element, the inlet sealing element disposed an inlet seal distance away from a plane defined by the flange;

the second port comprises an outlet sealing element, the outlet sealing element disposed on outlet seal distance away from the plane; and the inlet seal distance is greater than the outlet seal distance.

12. A crankcase ventilation element, comprising:

a plate comprising a first port, the first port defining a first longitudinal axis extending from the plate in a first direction, wherein the first port defines an inlet opening to receive a fluid and a drain to drain a contaminant separated from the fluid, wherein the inlet opening and the drain are open parallel to the first direction;

a housing coupled with the plate, the housing defining an axial centerline, the housing comprising:

a second port defining a second longitudinal axis extending from the housing in a second direction opposite the first direction; and a flange extending around a perimeter of the housing, the flange comprising a sealing surface; and a filter media disposed between the plate and the housing, wherein:

the first port and the second port intersect the axial centerline;

the first port is axially offset from the second port; and the first port is laterally offset from the second port.

13. The crankcase ventilation element of claim 12, wherein the first port comprises an inner surface and an outer surface, the inlet opening disposed adjacent to and spaced apart from the inner surface, and the drain extending through the inner surface and the outer surface.

14. A crankcase ventilation element, comprising:

a plate comprising a first port, the first port extending from the plate in a first direction, and a plenum;

a housing coupled with the plate, the housing defining an axial centerline, wherein a majority of the plenum is disposed on a first side of the axial centerline and a majority of the first port is disposed on a second side of the axial centerline, the first side opposite the second side, and wherein the housing comprises:

a second port extending from the housing in a second direction opposite the first direction; and a flange extending around a perimeter of the housing, the flange comprising a sealing surface; and a filter media disposed between the plate and the housing, wherein:

the first port and the second port intersect the axial centerline;

the first port is axially offset from the second port; and the first port is laterally offset from the second port.

15. A crankcase ventilation element, comprising:

a plate, comprising:

a plate body; and a first port defining a first longitudinal axis extending from the plate body in a first direction, the first port comprising a first sealing element; and a housing coupled with the plate, the housing comprising:

a first end;

a second end opposite the first end;

a flange extending around a perimeter of the housing, the flange comprising a seal surface, the seal surface defining a plane orthogonal to the first direction; and a second port disposed proximate to the first end of the housing, the second port defining a second longitudinal axis extends from the housing away from the plate in a second direction opposite the first direction and orthogonal to the plane, the second port comprising a second sealing element, wherein the first sealing element is disposed a first seal distance from the plane and the second sealing element disposed a second seal distance from the plane, the second seal distance greater than the first seal distance; and wherein the first port is disposed closer to the first end of the housing than the second end.

16. The crankcase ventilation element of claim 15, wherein:

the plate comprises a plenum extending from the plate body to the first port, the plenum comprising a separator configured to separate a contaminant from a fluid; and the first port defines an inlet opening configured to receive the fluid and a drain configured to drain the contaminant separated from the fluid out of the crankcase ventilation element.

17. The crankcase ventilation element of claim 16, wherein the crankcase ventilation element comprises no drain external of the first port.

18. The crankcase ventilation element of claim 15, wherein:

the housing defines an axial centerline; and the first port and the second port intersect the axial centerline.

19. The crankcase ventilation element of claim 18, wherein the first port is laterally offset from the second port by a port offset distance, the port offset distance being approximately 7.10 mm.

20. A crankcase ventilation element, comprising:

a plate, comprising:

a plate body;

a first port extending from the plate body in a first direction, the first port comprising a first sealing element, an inlet opening configure to receive a fluid and a drain; and a plenum extending from the plate body to the first port, the plenum comprising a separator configured separate a contaminant from the fluid, and wherein the drain is configured to drain the contaminant separated from the fluid out of the crankcase ventilation element; and a housing coupled with the plate, the housing comprising:

a first end;

a second end opposite the first end;

a flange extending around a perimeter of the housing, the flange comprising a seal surface, the seal surface defining a plane; and a second port disposed proximate to the first end of the housing, the second port extends from the housing away from the plate in a second direction opposite the first direction, the second port comprising a second sealing element, wherein the first sealing element is disposed a first seal distance from the plane and the second sealing element disposed a second seal distance from the plane, the second seal distance greater than the first seal distance;

wherein the first port is disposed closer to the first end of the housing than the second end; and wherein the housing defines an axial centerline, wherein a majority of the plenum is disposed on a first side of the axial centerline and a majority of the first port is disposed on a second side of the axial centerline.

* * * * *